US011354159B2

(12) United States Patent
Liu et al.

(10) Patent No.: US 11,354,159 B2
(45) Date of Patent: Jun. 7, 2022

(54) METHOD, A DEVICE, AND A COMPUTER PROGRAM PRODUCT FOR DETERMINING A RESOURCE REQUIRED FOR EXECUTING A CODE SEGMENT

(71) Applicant: EMC IP Holding Company LLC, Hopkinton, MA (US)

(72) Inventors: Jinpeng Liu, Shanghai (CN); Pengfei Wu, Shanghai (CN); Junping Zhao, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 316 days.

(21) Appl. No.: 16/540,385

(22) Filed: Aug. 14, 2019

(65) Prior Publication Data

US 2020/0334083 A1 Oct. 22, 2020

(30) Foreign Application Priority Data

Apr. 22, 2019 (CN) .......................... 201910323600.4

(51) Int. Cl.
*G06F 9/50* (2006.01)
*G06F 8/41* (2018.01)
*G06F 9/38* (2018.01)

(52) U.S. Cl.
CPC .............. *G06F 9/5011* (2013.01); *G06F 8/41* (2013.01); *G06F 9/3812* (2013.01); *G06F 9/3836* (2013.01)

(58) Field of Classification Search
CPC .... G06F 9/5011; G06F 9/3812; G06F 9/3836; G06F 9/5016; G06F 9/5022; G06F 9/5027; G06F 9/505; G06F 9/5055; G06F 9/5061; G06F 9/5083; G06F 9/4881; G06F 8/41; G06F 8/37; G06F 8/42; G06F 8/423; G06F 8/427; G06F 8/441; G06F 8/45; G06F 2209/503; G06F 2212/1041
USPC ........... 712/245; 717/140–146; 718/100–108
See application file for complete search history.

(56) References Cited

U.S. PATENT DOCUMENTS

2001/0052120 A1* 12/2001 Babaian ................ G06F 8/4441
717/160
2002/0178144 A1* 11/2002 Hoshino ............. G06F 16/2343
2011/0271269 A1* 11/2011 Tazzari ................. G06F 9/4411
717/168
2014/0325521 A1* 10/2014 Li .......................... G06F 9/5027
718/104

(Continued)

OTHER PUBLICATIONS

U.S. Appl. No. 16/389,166, filed in the name of Junping Zhao et al. on Apr. 19, 2019 and entitled "Method, Device and Computer Readable Medium for Scheduling Dedicated Processing Resource."

(Continued)

*Primary Examiner* — Eric Coleman
(74) *Attorney, Agent, or Firm* — Ryan, Mason & Lewis, LLP

(57) ABSTRACT

A method comprises: compiling the code segment with a compiler; and determining, based on an intermediate result of the compiling, a resource associated with a dedicated processing unit and for executing the code segment. As such, the resource required for executing a code segment may be determined quickly without actually executing the code segment and allocating or releasing the resource, which helps subsequent resource allocation and further brings about a better user experience.

20 Claims, 9 Drawing Sheets

(56) References Cited

U.S. PATENT DOCUMENTS

2016/0196121 A1* 7/2016 Baskaran .............. G06F 8/4441
717/157

OTHER PUBLICATIONS

Wikipedia Contributors, "Deep Learning," Wikipedia, The Free Encyclopedia, https://en.wikipedia.org/w/index.php?title=Deep_learning&oldid=907716010, accessed Aug. 14, 2019, 26 pages.
Wikipedia Contributors, "Everything as a Service," Wikipedia, The Free Encyclopedia, https://simple.wikipedia.org/w/index.php?title=Everything_as_a_service&oldid=6536463, accessed Aug. 14, 2019, 2 pages.

* cited by examiner

METHOD, A DEVICE, AND A COMPUTER PROGRAM PRODUCT FOR DETERMINING A RESOURCE REQUIRED FOR EXECUTING A CODE SEGMENT

RELATED APPLICATION(S)

The present application claims priority to Chinese Patent Application No. 201910323600.4, filed Apr. 22, 2019, and entitled "A Method, a Device, and a Computer Program Product for Determining a Resource Required for Executing a Code Segment," which is incorporated by reference herein in its entirety.

FIELD

Embodiments of the present disclosure generally relate to use of dedicated processing resources, and more specifically, to a method, a device, and a computer program product for determining a resource required for executing a code segment.

BACKGROUND

Artificial intelligence (AI) (e.g., machine learning (ML), deep learning (DL) and data mining (DM)) has been widely developed, and numbers of artificial intelligence and deep learning applications have been deployed. These applications may be designed to accomplish various processing or analysis tasks on clients by using resources such as processing and storage resources. As artificial intelligence tasks have great complexity that is ever increasing, large and/or variable dedicated processing resources are required to satisfy normal running of corresponding applications. For example, a cloud-based computing system has been developed, which computing system comprises a machine (e.g., server) of one or more dedicated processing resources. In such a computing system, different clients may leverage (rent) dedicated resources in the computing system to run respective applications according to demands. However, current utilization of dedicated processing resources is rather inflexible, and thus the resource utilization efficiency is decreased or resources are wasted.

SUMMARY

Embodiments of the present disclosure provide a method, a device, and a computer program product for determining a resource required for executing a code segment.

In a first aspect of the present disclosure, a method is provided for determining a resource required for executing a code segment. The method comprises: compiling the code segment with a compiler; and determining, based on an intermediate result of the compiling, a resource associated with a dedicated processing unit and for executing the code segment.

In a second aspect of the present disclosure, a device is provided for determining a resource required for executing a code segment. The device comprises: at least one processing unit; at least one memory, coupled to the at least one processing unit and storing instructions executed by the at least one processing unit, the instructions, when executed by the at least one processing unit, causing the device to perform acts, including: compiling the code segment with a compiler; and determining, based on an intermediate result of the compiling, a resource associated with a dedicated processing unit and for executing the code segment.

In a third aspect of the present disclosure, a computer program product is provided. The computer program product is tangibly stored on a non-transient computer readable medium and comprises machine executable instructions which, when being executed, cause the machine to execute any step of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features and advantages of the present disclosure will become more apparent, wherein the same reference numerals typically represent the same components in the example embodiments of the present disclosure.

Throughout the figures, the same or corresponding numerals denote the same or corresponding parts.

DETAILED DESCRIPTION

Figure 1:
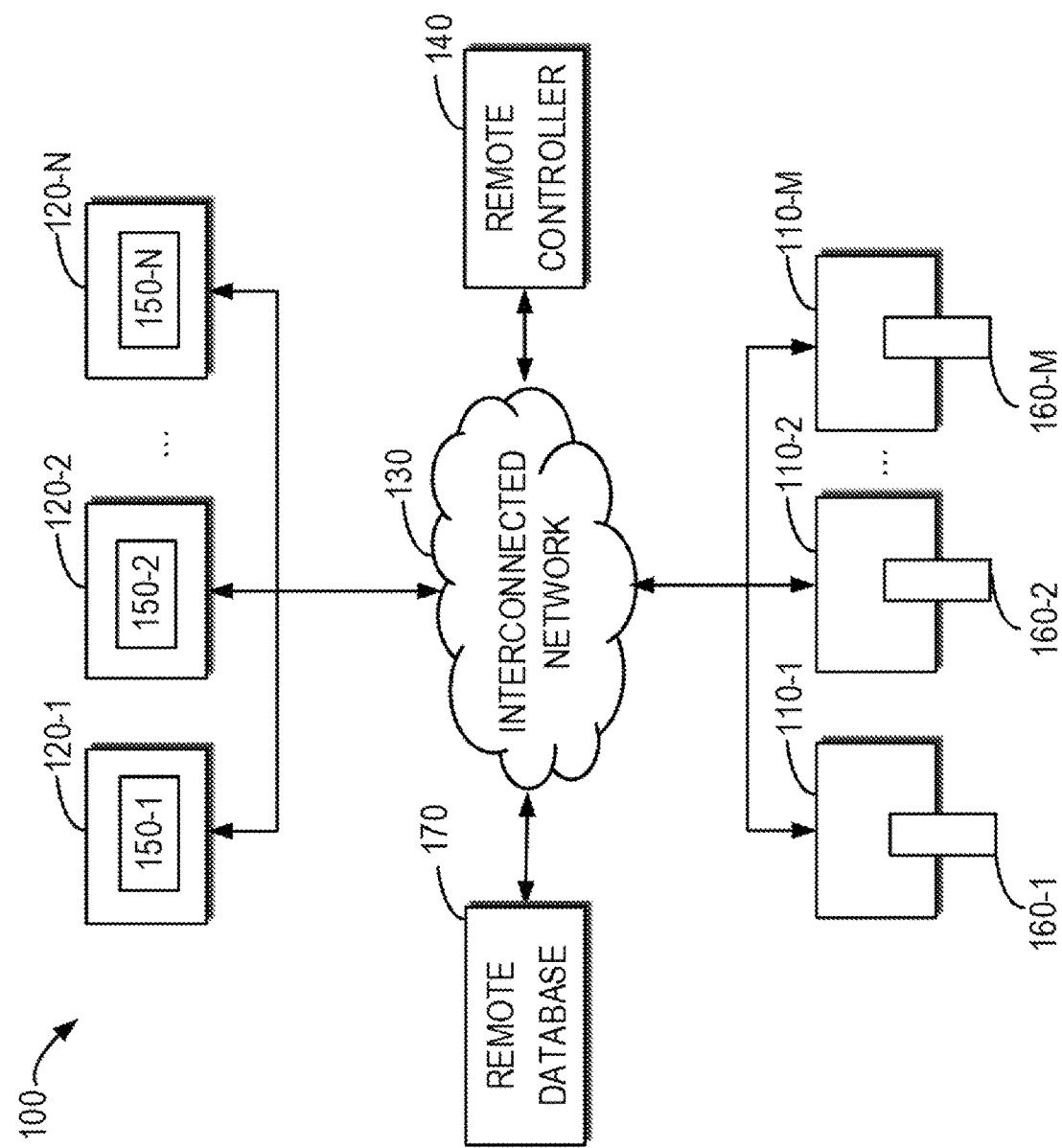
FIG. 1 shows a schematic view of a computing system in which some embodiments of the present disclosure may be implemented.

Some preferred embodiments will be described in more detail with reference to the accompanying drawings, in which the preferred embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used here are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

As described in the Background, with the development of artificial intelligence technology, in order to better serve processing and analysis tasks involved in artificial intelligence technology, there is a need to estimate the resource amount of required dedicated processing resources to perform processing and analysis tasks, so that dedicated processing resources may be brought into rational and efficient use.

Take deep learning that leverages resources (e.g., computing resources and storage resources) of dedicated processing units (e.g., graphics processing units (GPUs)) in artificial intelligence technology as an example. During processing and analyzing a task, attention needs to be focused on how many threads on dedicated processing units are needed for computation and how much memory is needed, because both quantities of (threads) dedicated processing units and memories on a server are limited. In practice, memory resources might attract most attention for a single dedicated processing unit.

For example, in an Everything-as-a-Service (XaaS) framework, a distributed and parallel DL framework can work in several different ways. In a DL framework for metadata extraction, a DL task can be scheduled into multiple dedicated processing units or virtual dedicated processing units as if this task is running on a single virtual dedicated processing unit which has more powerful computation capacity, or on a virtual dedicated processing unit which is only a sub-device of a physical dedicated processing unit and which has only a part of the computation capacity of its host dedicated processing unit. In a DL framework based on intermediate representation (IR) and working in a data parallelism manner, for the scheduler to work, it is necessary to know how much memory (how many memory resources) and threads/blocks/streaming multiprocessors (SMs) are needed to perform this deep computation. In a DL framework based on IR and working in model parallelism way, the scheduler needs to know how many memory and threads/blocks/SMs are needed to execute one or several certain kernel functions in a specific dedicated processing unit. In all cases, to effectively schedule the DL task, it is necessary to know the resource requirement of this task before actually running this task.

The DL task is essentially a program and may also be referred to code segment in some cases. While executing an ordinary program or DL program, a compiler is needed to compile the program.

In modern compiler design and implementation, a compiler (such as GCC and LLVM) for an ordinary program (such as C/C++ or FORTRAN) is usually split into two components: the front end and the back end. The front end takes a source program as input and translates it into a hardware-independent IR. The IR is another program written in another language used within the compiler, but is easy to be optimized and easy to be converted into machine code. Afterwards, the back end compiles and optimizes the IR program into a binary executable containing the machine code of the target central processing unit (such as X86, Power or ARM, etc.). When this executable binary is put into running, normally it still needs the support from the runtime: First, it needs the loader from the operating system to load itself and other dynamically linked libraries (DLLs, such as C standard library, CUDA runtime library, etc.) into the main memory of the computer. Second, it needs a linker to relocate the address of unresolved symbols or functions based on the addresses of the loaded DLLs. In Linux, the ld program is working as both the loader and linker.

For DL developing, a DL developing framework normally consists of the front end and the back end. The front end provides a set of application programming interfaces (APIs) to the programmer which are normally defined in a more easily used programming language (such as Python). The APIs define the usable data types such as tensors, arrays, etc., and methods below: how to define different layers, such as input layer, output layer and hidden layers and the operations upon each hidden layer; how to construct the whole neural network by connecting different layers; the classifier function, etc. The back end is normally implemented in a more effective language (such as C or C++). The back end needs to implement all data types and methods defined in the API. During runtime, the front end is linked to the back end via Python C/C++ extension or DLLs compiled from the back end.

Just like the ordinary program compiler, a DL compiler, which may be embedded in the framework or may be a standalone executable, consists of the front end and the back end also, but with many differences from the DL developing framework.

In the DL compiler, the result IR output from the front end by compiling a DL program is normally a computation graph, instead of an IR program. The vertexes (or nodes) of the computation graph define the computation in the neural network (normally called kernels), and the edge between two vertexes defines the dependency between two kernels. Usually, this IR computation graph is different from a graph defined by the user in the program, as the compiler always performs some optimization upon the original computer graph. Some ordinary optimization operations are fusing several operation nodes into one, tiling the matrix operations, etc.

Instead of just generating code for the target central processing unit, the code generating in the back end of a DL compiler will generate two parts of code: the host code and the device code.

The host code will be compiled into a CPU executable by an ordinary compiler (such as GCC or LLVM). This executable is the same as the one in an ordinary program, running in the central processing unit and main memory in the host computer and having the support from the runtime. The main role of the host code is basically a scheduler and coordinator for the kernel functions running in the dedicated processing unit device.

The device code is generated for the target devices and will be compiled into libraries by a vendor-specific compiler. The result library will be running in the target devices attached to the host, therefore, it can't have any support except from the host code.

For example, if the target device is an Nvidia dedicated processing unit, the device code could be the C/C++ code or PTX code of CUDA kernel functions with each kernel function corresponding to a kernel operation defined in the IR computation graph. This code will be compiled by the vendor specific compiler (such as NVCC). The main role of the device code is basically a library, waiting for the invocation from the host code.

The typical workflow of the host code may comprise: initializing the target dedicated processing unit device; reading in the IR computation graph; for each computation node in the computation path in the graph, choosing the corresponding CUDA kernel function implementation from the device code library, allocating the memory for the input and output for the kernel function, allocating the workspace memory for the kernel function execution, copying the input parameters of the kernel function from the central processing unit to the dedicated processing unit, invoking the kernel function, executing the kernel function in the dedicated processing unit, copying the output of the kernel function from the dedicated processing unit back to the central processing unit; releasing the target dedicated processing unit device; and outputting the computation result.

Currently, the most usual way to know how many memory or threads are used in a CUDA application is to use the nvidia-smi toolkit delivered along with CUDA SDK. And other tools (such as nvprof) are very useful also in tuning CUDA application performance. But both tools have the same problems: First, only global information can be provided, such as utilization efficiency indicating how many memory and dedicated processing units are used, or how many page switches have happened. No detailed information is presented and therefore is useless for resource scheduling. Second, the application needs to be run to the end, and the problems arising therefrom are: in a framework such as Asaka, or a framework based on IR, the compiling process is normally in a portal or a client, without being equipped with any dedicated processing unit device, so that the compiling can't be executed at all; as the compiling process is coupled with the DL training process, it is very time and computation resource consuming. Most importantly, if the whole learning process is actually run, there is no need to collect the metadata at all for the purpose of judging resources required for performing the task.

In order to at least partly solve one or more of the above and other potential problems, embodiments of the present disclosure propose a solution for determining a resource required for executing a code segment. The solution presents a novel method for judging a resource required for performing a task by creating a dummy DL compiler to collect the memory and threads/blocks requirement to run a DL task in the dedicated processing unit. With the technical solution of the present disclosure, a resource required for performing a task may be determined effectively and efficiently.

It should be understood although a discussion is presented herein by taking a DL application as an example of emerging technology applications, embodiments of the present invention may also be applicable to other emerging technology applications, such as high-performance computing application, machine learning application and artificial intelligence application.

FIG. 1 is a schematic diagram illustrating an example computing system 100 in which embodiments of the present disclosure can be implemented. A plurality of servers for running applications, including a server 110-1, a server 110-2, . . . , a server 110-M (hereinafter collectively or individually referred to as a server 110, wherein M is a natural number greater than 1), are deployed in the computing system 100. The computing system 100 further includes a dedicated computing resource 160-1, a dedicated computing resource 160-2, . . . , a dedicated computing resource 160-M (hereinafter collectively or individually referred to as a dedicated computing resource 160, wherein M is a natural number greater than 1). Each server 110 has one or more dedicated computing resources 160. A dedicated processing resource cluster or pool comprising such dedicated processing resource servers 160 is dynamic and shared.

In the example of FIG. 1, the server 110-1 has the dedicated computing resource 160-1, the server 110-2 has the dedicated computing resource 160-2, and the server 110-M has the dedicated computing resource 160-M. Examples of the dedicated computing resource 160 may include, but are not limited to, a Graphics Processing Unit (GPU), a Field Programmable Gate Array (FPGA), or the like. For the sake of discussion, some embodiments will take GPU as the example of the dedicated computing resources 160. In addition to the dedicated computing resource 160, the server 110 may further include, for example, one or more general processing units such as a central processing unit (CPU) (not shown).

FIG. 1 further illustrates a plurality of clients 120-1, 120-2, . . . , 120-N (hereinafter collectively or individually referred to as a client 120, wherein N is a natural number greater than 1) respectively having applications 150-1, 150-2, . . . , 150-N (hereinafter collectively or individually referred to as an application 150, wherein N is a natural number greater than 1) to run. The application 150 may be any application running on the machine, and the application can be designed to perform corresponding data processing or analyzing tasks. As an example, the application 150 can perform data processing or analyzing tasks related to deep learning, machine learning or high performance computing and artificial intelligence (AI).

To quickly and efficiently run these applications 150, the client 120 may request the dedicated computing resource 160 of the server 110 to run these applications 150. In such an implementation, the client 120 may be connected via an interconnected network 130 to one or more servers 110 and hand over the application 150 to run by one or more dedicated computing resources 160 of the server 110. The interconnected network 130 can support different types of wired or wireless connections based on various network transmission techniques, for example, remote direct memory access (RDMA), transmission control protocol (TCP) or the like, depending on interfaces supported by the client 120, the server 110 and/or the dedicated computing resource 160.

It should be understood that the device and/or arrangement as shown in FIG. 1 is provided as an example only. In other examples, the computing system 100 can include any suitable number of servers 110 and clients 120. Each server 110 can be mounted with any suitable number of dedicated computing resources 160 and each client 120 can have a plurality of applications 150 to run. In addition, the dedicated processing resource scheduling system 100 further comprises a remote controller 140 and a remote database 170.

The remote controller 140 may allocate the dedicated processing resource 160 to the client 120 based on the amount of resource of dedicated processing resources requested by the client 120 and available dedicated processing resources in the system 100. Then, the client 120 may request the allocated dedicated processing resource 160 to the dedicated processing resource server 110. The remote database 170 can communicate with the client 130 and the remote controller 140 via the interconnected network 130. The remote database 170 can store metadata which are extracted when the client 130 compiles the application 150, and the metadata can be obtained by the remote controller 140. It should be understood although the controller 140 and the remote database 170 shown in FIG. 1 are separate, they may also be implemented on the same device.

To describe in a clear and concise manner, example embodiments of the present disclosure will be described in detail by mainly taking the GPU as an example of the dedicated processing resource 160. It is known that GPU, as a dedicated processor, has strong computing capability due to a large number of kernels and high-bandwidth memory. In the GPU hardware architecture, one GPU usually has a large number of GPU kernels, such as several thousand or up to ten thousand kernels. The GPU kernel, as a dedicated computing resource, is the most basic processing unit, which is also known as stream processor (SP). Instructions and tasks are eventually processed on the GPU kernel. A plurality of GPU kernels simultaneously execute the instructions to implement parallel computing of the GPU. A plurality of SPs, in addition to other resources such as register and shared memory, can compose one stream multiprocessor (SM).

However, it should be understood that GPU is only an example dedicated computing resource 160, and shall not limit the scope of the present disclosure. Spirits and principles described herein can be applied to other dedicated computing resources, for example processing resources in an accelerator such as Field Programmable Gate Array (FPGA) currently known or to be developed in the future, without limiting to the GPU kernel only.

Figure 2:
FIG. 2 shows a flowchart of a method for determining a resource required for executing a code segment according to embodiments of the present disclosure.

FIG. 2 shows a flowchart of a method 200 for determining a resource required for executing a code segment according to embodiments of the present disclosure. The method 200 may be performed at the client as shown in FIG. 1. It should be understood that the method 200 may further comprise an additional step which is not shown and/or may omit a step which is shown, and the scope of the present disclosure is not limited in this regard.

At block 202, the client 120 compiles a code segment with a compiler. According to embodiments of the present disclosure, the code segment may refer to a program or an application, such as a DL application. The compiler may comprise various compilers which are located at the client 120 for compiling the code segment, such as compilers for the front end or back end.

According to embodiments of the present disclosure, the client 120 will generate intermediate results when compiling the code segment with the compiler. These intermediate results may be host code, device code and metadata, etc., among which the host code and the device code may be provided in the form of binary code. These intermediate results comprise information related to the resource required for executing the code segment.

At block 204, the client 120 determines a resource for executing the code segment and associated with a dedicated processing unit based on the compiled intermediate result. At this point, the resource for executing the code segment and associated with a dedicated processing unit may be determined by means of the intermediate result without actually executing the code segment.

According to embodiments of the present disclosure, the client may generate host code when compiling the code segment with the compiler. During the host code generation process, the compiler needs to generate the host code, which comprises the memory allocation/release functions in the dedicated processing unit device. These resources will be used to run corresponding programs. For example, in a scenario of running an expansion program, before the expansion program is executed by the dedicated processing unit, first its corresponding parameters, outputs and other resources need to be allocated. For the ordinary C program, the programmer needs to write these content in language C when writing the expansion program with C program. However, regarding a DL program, the programmer only needs to write an algorithm, network structure and each operator related to DL. Regarding how to allocate memory on the dedicated processing unit and execute a code function by the dedicated processing unit, this is provided by a framework with the compiler.

Therefore, according to embodiments of the present disclosure, the intermediate result generated by the compiler may be processed so as to determine a resource for executing the code segment and associated with the dedicated processing unit. For example, in a scenario of the NVIDIA dedicated processing unit, the generated intermediate result may be a C program of NVCC. Therefore, the C program may be processed, fetching key data and functions such as the memory allocation/release functions, so that the maximum value (e.g. 200 MB) of the memory requirement at peak may be recorded.

Regarding the DL program, the compiler works as a routine and according to certain rules, but the work of the compiler will not vary as the network structure varies. This is because the dedicated processing unit program is ultimately a computation graph before being compiled, and a pointing relation between one node and another node (e.g. node A points to node B) indicates node B must follow the completion of computation at node A, and thus the computation result of node A needs to obtained as the input of node B. Therefore, the running of the DL program is essentially a cycle, wherein it is necessary to traverse all computation graphs, find all dependencies and later generate C language code. In such a process, before compiling each node, it is necessary to go through the same work, such as allocating memory, allocating a thread, generating thread code, etc. Content of the work is essentially the same, but only content of the code differs.

According to embodiments of the present disclosure, during the device code generation process, every compiler needs to call the APIs linking to the vendor specific compiling library (such as libNVVM from NVIDIA in TVM) linking to the vendor specific kernels implementation library (such as cuDNN library from NVIDIA in TensorFlow). In each case, some extra function calls may be added to other APIs inside the compiling library or the kernel implementation library to get the dynamic memory requirement of callee kernel functions. Therefore, according to embodiments of the present disclosure, a dummy DL compiler may be created during compiling the code segment, without changing anything inside the front end, but by modifying the compiler behavior during the operation of the code generator.

Figure 3:
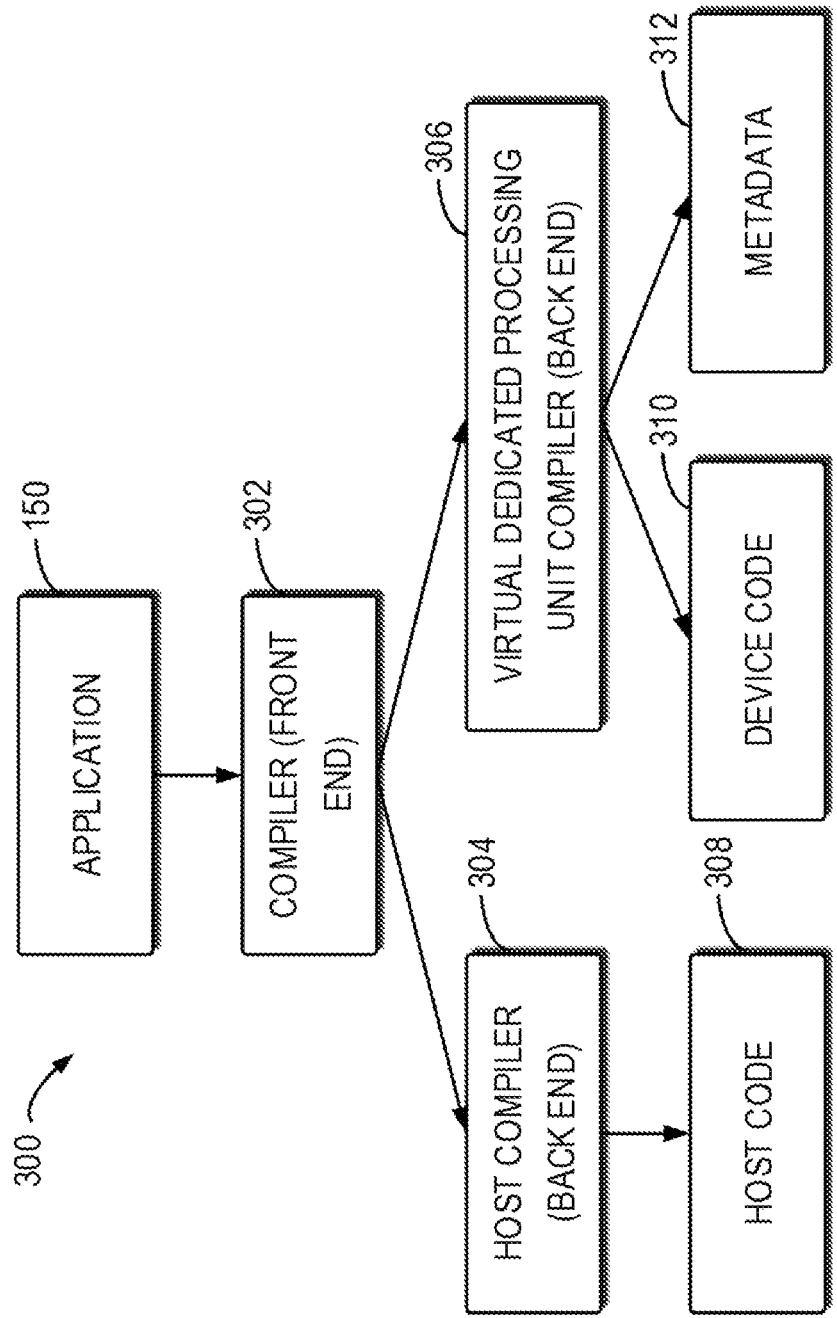
FIG. 3 shows a schematic view of a compiling process according to embodiments of the present disclosure.

FIG. 3 shows a schematic view of a compiling process 300 according to embodiments of the present disclosure, wherein comprised is a virtual dedicated processing unit compiler created according to embodiments of the present disclosure. The compiling process 300 may be performed at, for example, the client 120 as shown in FIG. 1. It should be understood the compiling process 300 may further comprise additional content which is not shown and/or may omit content which is shown, and the scope of the present disclosure is not limited in this regard.

In the compiling process 300, initially, the application 150 is provided to a compiler (front end) 302 so as to be compiled. As described above, the compiler (front end) 302 compiles the application 150 and may generate a computation graph, for example.

Then, the computation graph generated by the compiler (front end) 302 compiling the application 150 is provided to a host compiler (back end) 304 and a virtual dedicated processing unit compiler (back end) 306 so as to be compiled. As described above, the host compiler (back end) 304 compiles the computation graph and may generate host code 308. According to embodiments of the present disclosure, the virtual dedicated processing unit compiler (back end) 306 compiles the computation graph and may generate device code 310 and metadata 312. During the operation of the virtual dedicated processing unit compiler (back end) 306, code for initialization, resource allocation or release, and report outputting may be generated in succession.

According to embodiments of the present disclosure, the code used for initialization may be used to initialize a resource record, while the resource record may record information related to a resource to be allocated or released. The resource record may utilize a maximum memory use indicator (max_mem), a total memory use indicator (total_mem), a resource indication linked list (res_list) and memory information listed list (mem_info) to record information related to a resource to be allocated or released.

The max_mem is used to indicate the maximum peak memory use allocated so far, and the total_mem is used to indicate totally how many memory resources are allocated so far. The max_mem is be used to report the resource requirement to the scheduler, and the total_mem is used only within the compiler to keep max_mem updated. The max_mem and total_mem are initialized to zero in the initialization stage.

The res_list contains a node for each function so as to record how many resources are needed for this function. This list will be used to report the resource requirement to the scheduler. The mem_info contains a node for each memory chunk, the node being allocated with the information of the size and the address of this memory chunk. This list is used internally for matching every release function to its corresponding allocation function. The code for initialization initializes the res_list and mem_info to 0, i.e., no content.

The initialized max_mem, total_mem, res_list and mem_info may be used to record information related to a resource to be allocated or released.

According to embodiments of the present disclosure, the code for resource allocation or release is generated during the execution process of the virtual dedicated processing unit compiler (back end) 306.

The purpose of embodiments of the present disclosure is to calculate the required amount of resource to execute the DL program without executing code on the dedicated processing unit. Therefore, code to be executed on the dedicated processing unit may be deleted from the intermediate result (such as function or code) generated by compiling the Dl program, and then the intermediate result will turn to an empty function. Since at this point the code will only be executed on the central processing unit instead of the dedicated processing unit, the execution time is quite short. This is because with respect to a massive DL program, it might take several weeks to execute deep code on the dedicated processing unit. Specifically, when code needs to be executed on the dedicated processing unit, some functions need to be executed on the central processing unit, CUDA is called to allocate memory on the central processing unit. Therefore, according to embodiments of the present disclosure, actual allocation of memory on the dedicated processing unit may be avoided by deleting or modifying code, and only allocation that used to be performed may be recorded (for example, it may be recorded how many memory resources need to be allocated when such a function is executed normally).

According to embodiments of the present disclosure, code to be executed at the dedicated processing unit will be deleted, code for memory allocation and release will be overwritten, and the following will be recorded: the maximum peak of current memory use and the total of memory use. Moreover, there exists a random value returned because of memory allocation, which may be a function pointer and correspond to an incoming parameter to indicate the size of memory allocated this time. The random value may be maintained, so that the pointer may be found in the list during releasing resources and then removed. It should be understood the implementation of the foregoing principles of the present disclosure may also be applied to the central processing unit, but not limited to the dedicated processing unit.

In some embodiments, the code generated by executing the virtual dedicated processing unit compiler (back end) 306 is processed as below.

If the code to be generated is to initialize or release the dedicated processing unit device, it is removed. As both the compiling library APIs and the resource calculating APIs only depend on the implementation inside CUDA runtime or driver API, the dedicated processing unit device is not required.

If the code to be generated is the C/C++ kernel source code running inside the dedicated processing unit, the source code is saved in a disk file.

If the code to be generated is to call the kernel functions: If the kernel is implemented in a library, the parameters are saved to the kernel function, and the kernel function call is replaced with the resource calculating API from the same library with the parameters whose values come from the saved parameters. These parameters normally are the size and pointers of the data chunks input to the kernel computation functions. If the kernel is implemented from compiling the C/C++ kernel source code generated before, an extra compiling API is added to get the dynamic resource requirement of this kernel function. In both cases, after the resource requirement API returns: The function name is obtained from the code generator; the size returned by the resource requirement API is saved, and it is searched whether the node of this function exists in res_list. If not, a new node is added into this list, and the returned resource is added to this function node. The total_mem is updated by adding size to it. If the total_mem is greater than the max_mem, the max_mem is updated as the total_mem.

If the code to be generated is to copy data from the central processing unit to the dedicated processing unit or verse visa, it will be removed.

If the code to be generated is to allocate memory in the dedicated processing unit: The kernel function is searched in the current active frame in the compiling state machine. The code generated for CUDA memory allocating function call is removed by directly returning a virtual unique address. It is searched whether the node of this function exists in the res_list. If not, a new node is added into this list, and the returned resource is added to this function node. A node (size, returned address) is added into the mem_info list. The total_mem is updated by adding size to it. If the total_mem is greater than the max_mem, the max_mem is updated as the total_mem.

If the code to be generated is to release a memory chunk in the dedicated processing unit: The node (size, returned address) is found from the mem_info list and the size is saved in this node. The total_mem is updated by subtracting the size from it. The node (size, returned address) is removed from the mem_info list.

According to embodiments of the present disclosure, the thread requirement for the kernel function may be obtained by intercepting calls of this function. Take Nvidia as an example. The kernel functions are normally launched by the host code using Nvidia driver API cuLaunchKernel, which is defined as below: CUresult cuLaunchKernel (CUfunction f, unsigned int gridDimX, unsigned int gridDimY, unsigned int gridDimZ, unsigned int blockDimX, unsigned int blockDimY, unsigned int blockDimZ, . . . ). By intercepting calls of this function, the thread requirement for each kernel function may be collected, wherein f is the kernel function; gridDimX, gridDimY, and gridDimZ these three parameters define how many blocks are there in a grid; and blockDimX, blockDimY, and blockDimZ these three parameters define how many threads are in every block. So the threads required to run the kernel function f are gridDimX * gridDimY * gridDimZ * blockDimX * blockDimY * blockDimZ.

Figure 4:
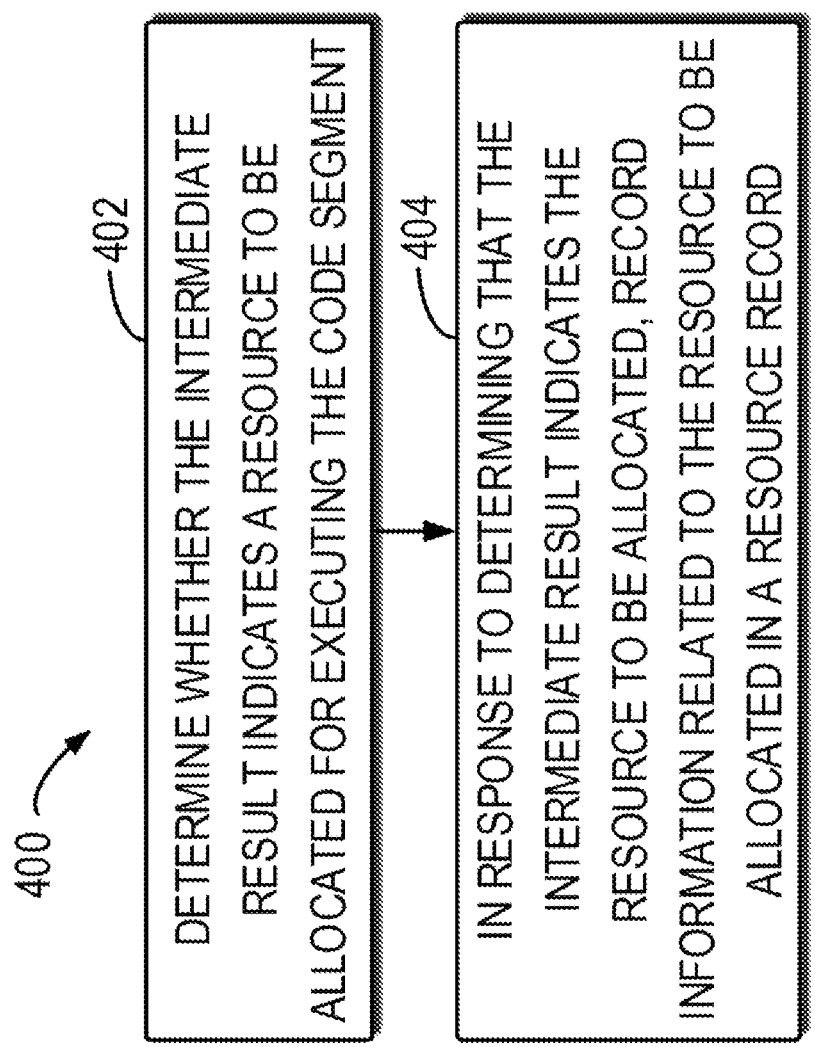
FIG. 4 shows a flowchart of a method for determining a resource according to embodiments of the present disclosure.
Figure 6:
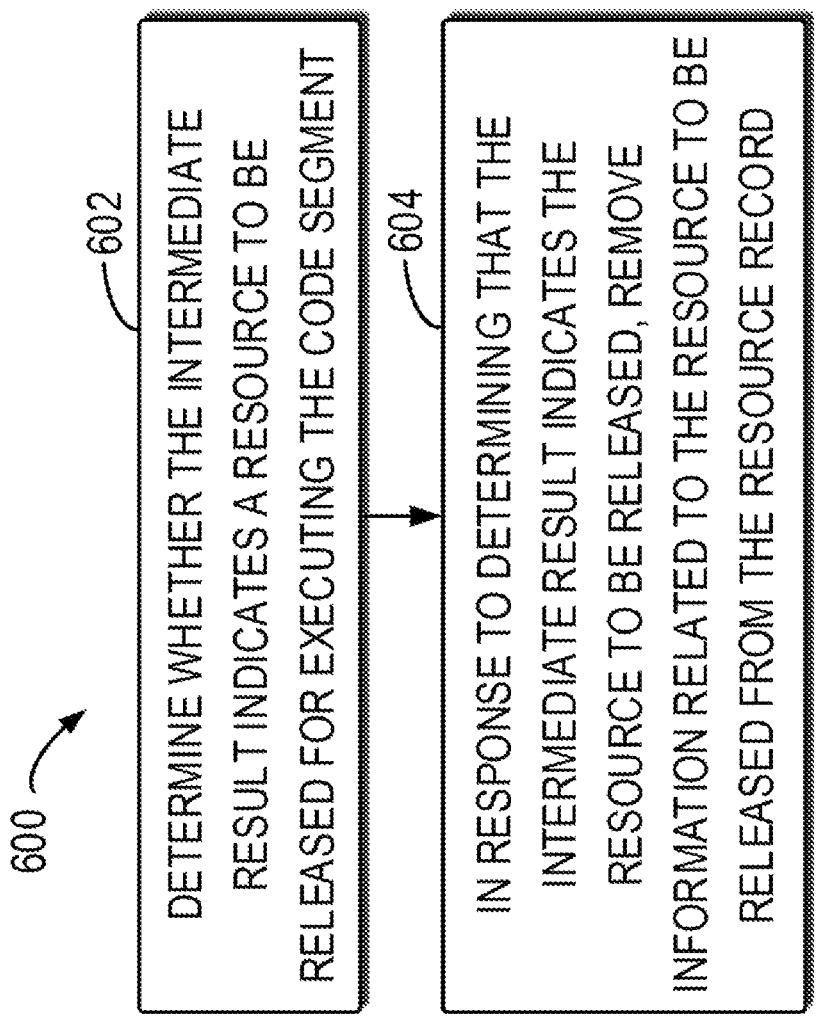
FIG. 6 shows a flowchart of a method for determining a resource according to embodiments of the present disclosure.

According to embodiments of the present disclosure, in view of the foregoing description, block 202 in the method 200 for determining a resource required for executing a code segment may be performed by a method 400 for determining a resource as shown in FIG. 4 and a method 600 for determining a resource as shown in FIG. 6.

FIG. 4 shows a flowchart of the method 400 for determining a resource according to embodiments of the present disclosure. Like the method 200, the method 400 may also be performed at the client 120 as shown in FIG. 1. It should be understood the method 400 may further comprise an additional step which is not shown and/or may omit a step which is shown, and the scope of the present disclosure is not limited in this regard.

At block 402, the client 120 determines whether the intermediate result indicates a resource to be allocated for executing the code segment. According to embodiments of the present disclosure, concrete content involved at block 402 may comprise the client 120 judging the code generated from executing the virtual dedicated processing unit compiler (back end) 308, so as to determine whether the generated code indicates the resource to be allocated for executing the code segment.

At block 404, the client 120 records information related to the resource to be allocated in a resource record in response to determining the intermediate result indicates the resource to be allocated. According to embodiments of the present disclosure, when the client 120 determines the generated code indicates the resource to be allocated for executing the code segment after judging the code generated from executing the virtual dedicated processing unit compiler (back end) 308, the client 120 records information related to the resource to be allocated. Since one of objectives of the present disclosure is to determine the resource required for executing the code segment with actual execution of the code segment being avoided, the method 400 may further comprise additional steps for processing resource allocation, which steps may be reflected in a method 500 for processing resource allocation as shown in FIG. 5.

Figure 5:
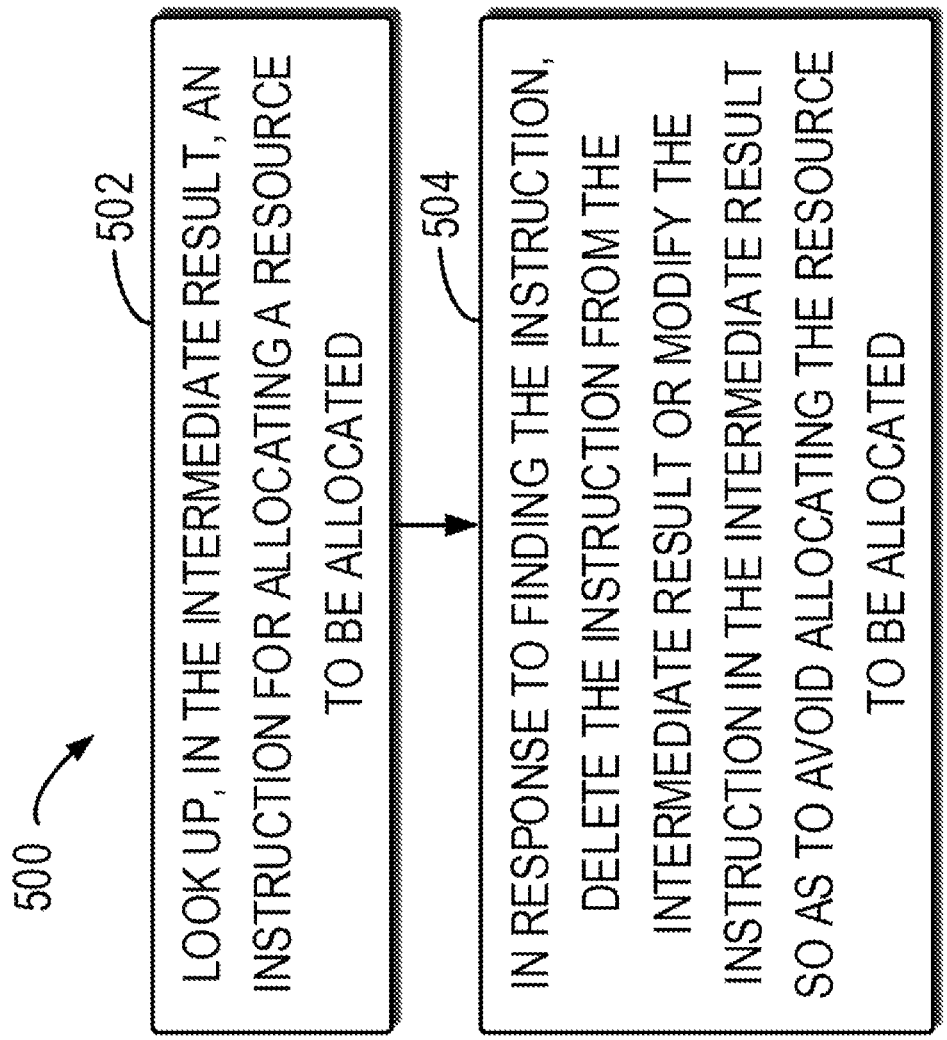
FIG. 5 shows a flowchart of a method for processing resource allocation according to embodiments of the present disclosure.

FIG. 5 shows a flowchart of the method 500 for processing resource allocation according to embodiments of the present disclosure. Like the methods 200 and 400, the method 500 may also be performed at the client 120 as shown in FIG. 1. It should be understood the method 500 may further comprise an additional step which is not shown and/or may omit a step which is shown, and the scope of the present disclosure is not limited in this regard.

At block 502, the client 120 looks up instructions for allocating the resource to be allocated in the intermediate result. According to embodiments of the present disclosure, concrete content involved at block 502 may comprise the client 120 judging the code generated from executing the virtual dedicated processing unit compiler (back end) 306, so as to determine whether the generated code indicates the resource to be allocated for executing the code segment, and looking up instructions for allocating the resource to be allocated in the intermediate result.

At block 504, in response to finding the instructions, the client 120 deletes the instructions from the intermediate result or modifies the instructions in the intermediate result so as to avoid allocation of the resource to be allocated. According to embodiments of the present disclosure, when the client 120 determines the instructions for allocating the resource to be allocated, actual execution of the code segment may be avoided by deleting these instructions. According to other embodiments of the present disclosure, when the client 120 determines the instructions for allocating the resource to be allocated, these instructions may be modified to avoid allocation of the resource to be allocated, thus avoiding actual execution of the code segment and actual resource allocation at the same time.

FIG. 6 shows a flowchart of a method 600 for determining a resource according to embodiments of the present disclosure. Like the methods 200, 400 and 500, the method 600 may also be performed at the client 120 as shown in FIG. 1. It should be understood the method 600 may further comprise an additional step which is not shown and/or may omit a step which is shown, and the scope of the present disclosure is not limited in this regard.

At block 602, the client 120 determines whether the intermediate result indicates a resource to be released for executing the code segment. According to embodiments of the present disclosure, concrete content involved at block 602 may comprise the client 120 judging the code generated from executing the virtual dedicated processing unit compiler (back end) 306, so as to determine whether the generated code indicates the resource to be released for executing the code segment.

At block 604, in response to determining the intermediate result indicates the resource to be released, the client 120 removes from a resource record information related to the resource to be released. According to embodiments of the present disclosure, when the client 120 determines the generated code indicates the resource to be released for executing the code segment after judging the code generated from executing the virtual dedicated processing unit compiler (back end) 306, the client 120 removes from a resource record information related to the resource to be released. It should be understood a resource involved in the information related to the resource to be released and to be removed from the resource record may be the resource involved in the information related to the to-be-allocated resource as recorded in the resource record at block 404 of the method 400. Since one of the objectives of the present disclosure is to determine the resource required for executing the code segment with actual execution of the code segment being avoided, the method 600 may further comprise additional steps for processing resource release, which steps may be reflected in a method 700 for processing resource release as shown in FIG. 7.

Figure 7:
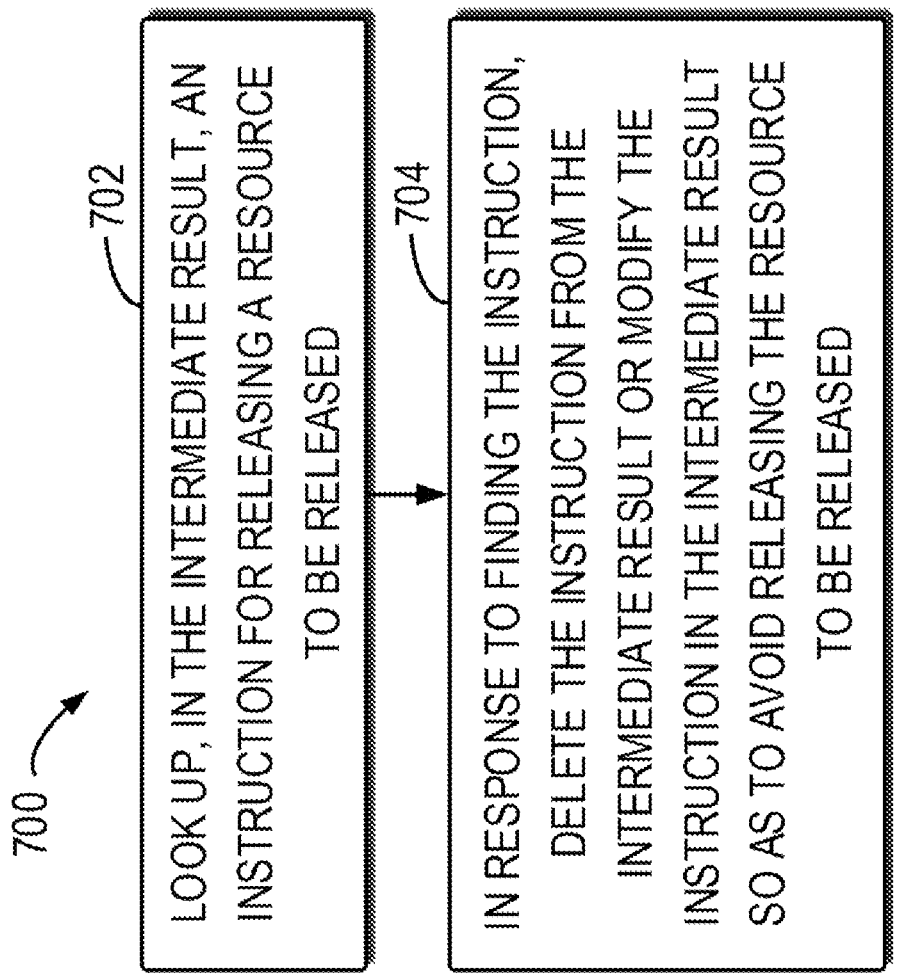
FIG. 7 shows a flowchart of a method for processing resource release according to embodiments of the present disclosure.

FIG. 7 shows a flowchart of the method 700 for processing resource release according to embodiments of the present disclosure. Like the methods 200, 400, 500 and 600, the method 700 may also be performed at the client 120 as shown in FIG. 1. It should be understood the method 700 may further comprise an additional step which is not shown and/or may omit a step which is shown, and the scope of the present disclosure is not limited in this regard.

At block 702, the client 120 looks up instructions for releasing a resource to be released in the intermediate result. According to embodiments of the present disclosure, concrete content involved at block 702 may comprise the client 120 judging the code generated from executing the virtual dedicated processing unit compiler (back end) 306, so as to determine whether the generated code indicates the resource to be allocated for executing the code segment, and looking up instructions for releasing a resource to be released in the intermediate result.

At block 704, in response to finding the instructions, the client 120 deletes the instructions from the intermediate result or modifying the instructions in the intermediate result so as to avoid releasing the resource to be released. According to embodiments of the present disclosure, when the client 120 determines the instructions for releasing the resource to be released, actual execution of the code segment may be avoided by deleting these instructions. According to other embodiments of the present disclosure, when the client 120 determines the instructions for releasing the resource to be released, these instructions may be modified to avoid releasing the resource to be released, thus avoiding actual execution of the code segment and actual resource release at the same time.

According to embodiments of the present disclosure, since the DL program may involve repetitive allocation and release of the dedicated processing unit resource, steps of the methods 400, 500, 600 and 700 may be performed repetitively and iteratively, until the client 120 completes compiling the code segment with the compiler. At this point, the method 400, 500, 600 or 700 may further comprise additional steps for determining a resource required for executing a code segment by an amount of resource, which steps may be reflected in a method 800 for determining a resource as shown in FIG. 8.

Figure 8:
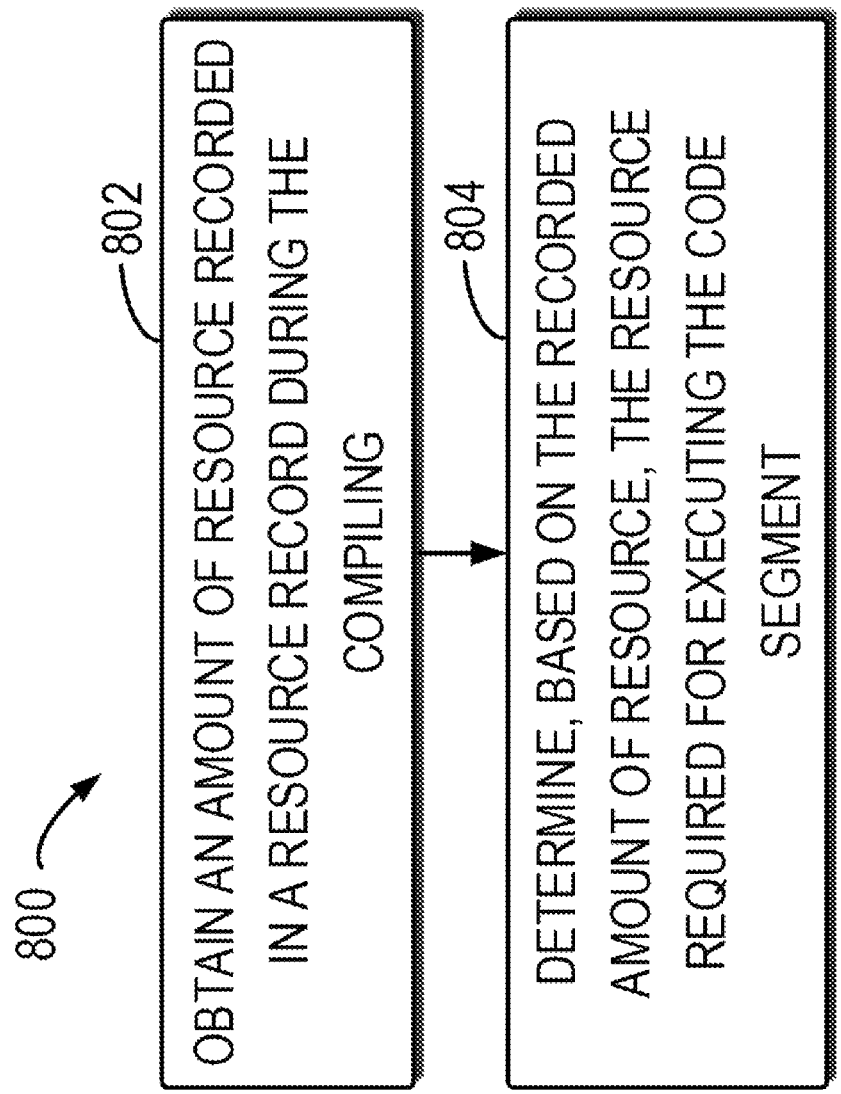
FIG. 8 shows a flowchart of a method for determining a resource according to embodiments of the present disclosure.

FIG. 8 shows a flowchart of a method 800 for determining a resource according to embodiments of the present disclosure. Like the methods 200, 400, 500, 600 and 700, the method 800 may also be performed at the client 120 as shown in FIG. 1. It should be understood the method 800 may further comprise an additional step which is not shown and/or may omit a step which is shown, and the scope of the present disclosure is not limited in this regard.

At block 802, the client 120 obtains an amount of resource recorded in a resource record during compiling the code segment. According to embodiments of the present disclosure, the amount of resource may comprise an amount of resource indicated by the maximum memory use indicator (max_mem) and the total memory use indicator (total_mem), wherein such information may be comprised as the maximum peak memory use allocated so far and the total memory use allocated so far. In addition, the amount of resource may also comprise a current amount of resource recorded by the method 400, 500, 600 or 700 after each execution.

At block 804, the client 120 determines the resource required for executing the code segment based on the recorded amount of resource. According to embodiments of the present disclosure, the client 120 may determine the resource required for executing the code segment from the amount of resource recorded in a resource record during compiling the code segment as obtained at block 802. At this point, the resource required for executing the code segment is determined without actually executing the code segment and allocating or releasing the resource.

According to embodiments of the present disclosure, the virtual compiler may be integrated into the DL Python program. At this point, since the virtual compiler is called from the DL Python program, a compiler internal API needs to be passed to the DL Python program also. This API will return the memory/thread requirement for execution of the DL task.

In practical tests according to embodiments of the present disclosure, the real compiler is used to compile a Keras ResNet-50 model, the code segment for determining a resource is executed in a CUDA GPU, and the toolkit nvidia-smi is used to profile the memory usage. After testing, the resource use obtained by the real compiler is completely the same as the resource use determined from compiling the same DL program by the virtual compiler.

It should be understood the numbers of various elements and sizes of physical quantities as shown in various figures are merely for the example purpose but not limiting the protection scope of the present disclosure. The numbers and sizes may be set according to needs without any impact on the normal implementation of embodiments of the present disclosure.

With reference to FIGS. 2 to 8, description has been presented to flows and content of the method 200 for determining a resource required for executing a code segment, the compiling process 300, the method 400 for determining a resource, the method 500 for processing resource allocation, the method 600 for determining a resource, the method 700 for processing resource release and the method 800 for determining a resource. It should be understood the foregoing description is to better present content of the present disclosure rather than limiting in any way.

As seen from the foregoing description with reference to FIGS. 1 to 8, the technical solution of embodiments according to the present disclosure has many advantages over the traditional solution. For example, by creating a virtual DL compiler and compiling the DL program with it, the dynamic resource requirement of the kernel function which is collected from NVCC before can be collected effectively. At this point, the necessary information can be collected even the DL framework is using a third party dedicated processing unit kernel implementations and bypasses the CUDA kernel functions. In addition, when all device-related operations (such as code involved) are removed from the virtual compiler, the compiling process only depends on the CUDA software. Therefore, the DL program can be compiled in a portal or a client, without equipping any dedicated processing unit device. Moreover, as all real kernel operations and data movement have been removed from the virtual compiler, the compiling process will be finished very quickly. Meanwhile, when the function invocation information is recorded from the code generator, all the information as to when and where memory is allocated and released may be obtained. Finally, global information may be directly reported to the scheduler as to how many resources are required and how these resources are used by which kernel functions.

Therefore, with the technical solution of the present disclosure, the resource required for executing the code segment may be determined quickly without actually executing the code segment and allocating or releasing the resource, which helps subsequent resource allocation and further brings about better user experience.

Figure 9:
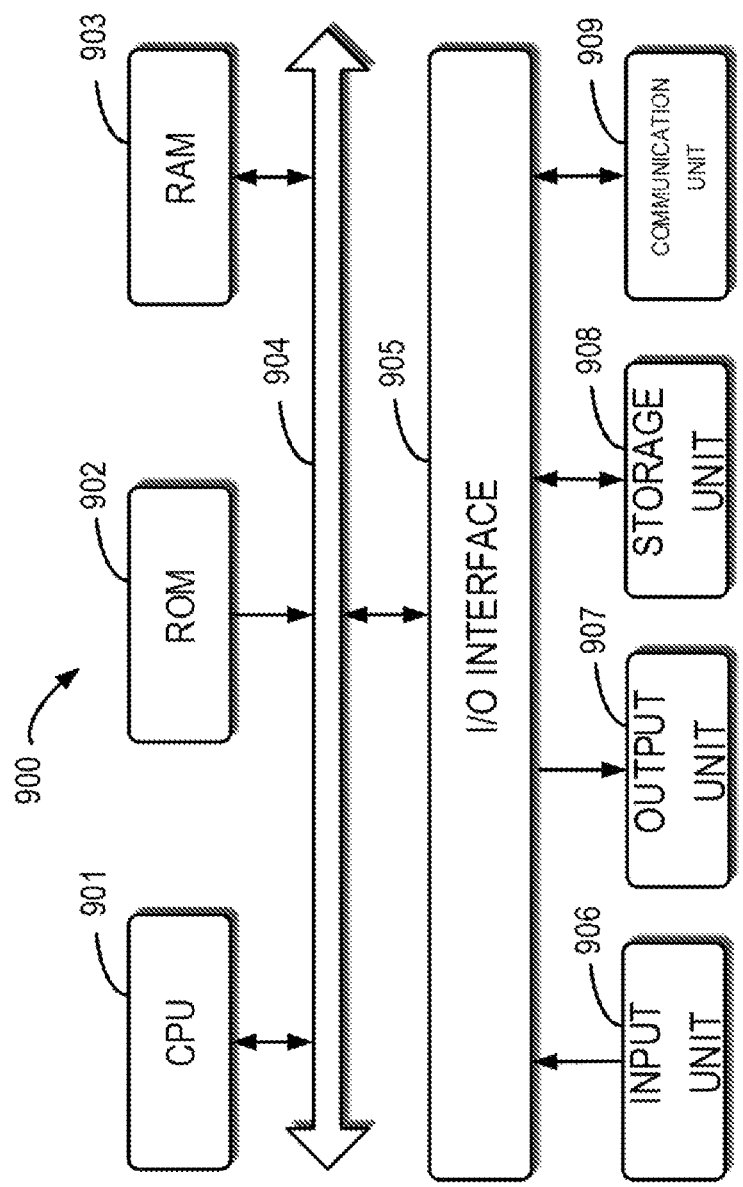
FIG. 9 shows a schematic block diagram of an example device which is applicable to implement embodiments of the present disclosure.

FIG. 9 shows a schematic block diagram of an example device 900 suitable for implementing embodiments of the present disclosure. As depicted, the device 900 comprises a central processing unit (CPU) 901 which is capable of performing various appropriate actions and processes in accordance with computer program instructions stored in a read only memory (ROM) 902 or computer program instructions loaded from a storage unit 908 to a random access memory (RAM) 903. In the RAM 903, there are also stored various programs and data required by the device 900 when operating. The CPU 901, the ROM 902 and the RAM 903 are connected to one another via a bus 904. An input/output (I/O) interface 905 is also connected to the bus 904. Multiple components in the device 900 are connected to the I/O interface 905: an input unit 906 including a keyboard, a mouse, or the like; an output unit 907, such as various types of displays, a loudspeaker or the like; a storage unit 908, such as a disk, an optical disk or the like; and a communication unit 909, such as a LAN card, a modem, a wireless communication transceiver or the like. The communication unit 909 allows the device 900 to exchange information/data with other device via a computer network, such as the Internet, and/or various telecommunication networks.

The above-described procedures and processes (such as the methods 200, 400, 500, 600, 700 and 800) may be executed by the processing unit 901. For example, in some embodiments, the methods 200, 400, 500, 600, 700 and 800 may be implemented as a computer software program, which is tangibly embodied on a machine readable medium, e.g. the storage unit 908. In some embodiments, part or the entirety of the computer program may be loaded to and/or installed on the device 900 via the ROM 902 and/or the communication unit 909. The computer program, when loaded to the RAM 903 and executed by the CPU 901, may execute one or more acts of the methods 200, 400, 500, 600, 700 and 800 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

What is claimed is:

1. A method for determining a resource required for executing a code segment, the method comprising:
    compiling a code segment with a compiler;
    identifying, within an intermediate result of the compiling, an instruction indicating a resource, associated with a dedicated processing unit, to be allocated for executing the code segment;
    in response to determining that the intermediate result indicates the resource to be allocated, recording, in a resource record, information related to the resource to be allocated; and
    in response to identifying the instruction for allocating the resource, further comprising:
        deleting the instruction from the intermediate result, or modifying the instruction in the intermediate result so as to avoid allocation of the resource to be allocated.

2. The method according to claim 1, further comprising:
    determining whether the intermediate result indicates a resource to be released for executing the code segment; and
    in response to determining that the intermediate result indicates the resource to be released, removing information related to the resource to be released from the resource record.

3. The method according to claim 2, further comprising:
    looking up, in the intermediate result, an instruction for releasing the resource to be released; and
    in response to finding the instruction,
        deleting the instruction from the intermediate result, or modifying the instruction in the intermediate result so as to avoid release of the resource to be released.

4. The method according to claim 1, further comprising:
    obtaining an amount of resource recorded in the resource record during the compiling; and
    determining, based on the recorded amount of resource, the resource required for executing the code segment.

5. The method according to any of claim 1, wherein the resource comprises at least one of a computing resource and a storage resource in a dedicated processing unit.

6. A device for determining a resource required for executing a code segment, comprising:
    at least one processing unit;
    at least one memory, coupled to the at least one processing unit and storing instructions executed by the at least one processing unit, the instructions, when executed by the at least one processing unit, causing the device to perform acts, including:
    compiling a code segment with a compiler;
    identifying, within an intermediate result of the compiling, an instruction indicating a resource, associated with a dedicated processing unit, to be allocated for executing the code segment;
    in response to determining that the intermediate result indicates the resource to be allocated, recording, in a resource record, information related to the resource to be allocated; and
    in response to identifying the instruction for allocating the resource, further comprising:
        deleting the instruction from the intermediate result, or modifying the instruction in the intermediate result so as to avoid allocation of the resource to be allocated.

7. The device according to claim 6, further comprising:
    determining whether the intermediate result indicates a resource to be released for executing the code segment; and
    in response to determining that the intermediate result indicates the resource to be released, removing information related to the resource to be released from the resource record.

8. The device according to claim 7, further comprising:
    looking up, in the intermediate result, an instruction for releasing the resource to be released; and
    in response to finding the instruction,
        deleting the instruction from the intermediate result, or modifying the instruction in the intermediate result so as to avoid release of the resource to be released.

9. The device according to claim 6, further comprising:
    obtaining an amount of resource recorded in the resource record during the compiling; and
    determining, based on the recorded amount of resource, the resource required for executing the code segment.

10. The device according to claim 6, wherein the resource comprises at least one of a computing resource and a storage resource in a dedicated processing unit.

11. A computer program product being tangibly stored on a non-transient computer readable medium and comprising machine executable instructions which, when being executed, causing a machine to perform steps of:
    compiling the code segment with a compiler;
    identifying, within an intermediate result of the compiling, an instruction indicating a resource, associated with a dedicated processing unit, to be at least one of allocated and released for executing the code segment;
    determining whether the intermediate result indicates the resource to be allocated for execution of the code segment;

in response to determining the intermediate result indicates the resource to be allocated, recording, in a resource record, information related to the resource to be allocated;

looking up, in the intermediate result, an instruction for allocating the resource to be allocated; and in response to finding the instruction,
deleting the instruction from the intermediate result, or modifying the instruction in the intermediate result so as to avoid allocation of the resource to be allocated.

12. The computer program product according to claim 11, further comprising:

determining whether the intermediate result indicates a resource to be released for executing the code segment; and in response to determining that the intermediate result indicates the resource to be released, removing information related to the resource to be released from the resource record.

13. The computer program product according to claim 12, further comprising:

looking up, in the intermediate result, an instruction for releasing the resource to be released; and in response to finding the instruction for releasing the resource,
deleting the instruction from the intermediate result, or modifying the instruction in the intermediate result so as to avoid release of the resource to be released.

14. The computer program product according to claim 11, further comprising:

obtaining an amount of resource recorded in a resource record during the compiling; and determining, based on the recorded amount of resource, the resource required for executing the code segment.

15. The method according to claim 1, wherein the resource record comprises at least one of the following: a maximum memory use indicator; a total memory use indicator; a resource indication linked list; and memory information listed list.

16. The method according to claim 1, wherein the code segment comprises a task of a deep learning application.

17. The device according to claim 6, wherein the resource record comprises at least one of the following: a maximum memory use indicator; a total memory use indicator; a resource indication linked list; and memory information listed list.

18. The device according to claim 6, wherein the code segment comprises a task of a deep learning application.

19. The computer program product according to claim 11, wherein the resource record comprises at least one of the following: a maximum memory use indicator; a total memory use indicator; a resource indication linked list; and memory information listed list.

20. The computer program product according to claim 11, wherein the code segment comprises a task of a deep learning application.

* * * * *